US010584985B2

(12) United States Patent
Mouard et al.

(10) Patent No.: US 10,584,985 B2
(45) Date of Patent: Mar. 10, 2020

(54) POINTER DEVICE FOR AN INDICATOR INSTRUMENT, IN PARTICULAR FOR A VEHICLE

(71) Applicant: Magneti Marelli S.p.A., Corbetta (IT)

(72) Inventors: Sylvain Mouard, Magenta (IT); Luca Carlone, Campobasso (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 288 days.

(21) Appl. No.: 15/388,854

(22) Filed: Dec. 22, 2016

(65) Prior Publication Data
US 2017/0184428 A1 Jun. 29, 2017

(30) Foreign Application Priority Data
Dec. 28, 2015 (IT) .......................... 102015000088072

(51) Int. Cl.
*G01D 13/22* (2006.01)
*G01D 11/28* (2006.01)
(Continued)

(52) U.S. Cl.
CPC ............. *G01D 13/22* (2013.01); *G01D 11/28* (2013.01); *G01D 13/265* (2013.01); *B60K 35/00* (2013.01);
(Continued)

(58) Field of Classification Search
CPC ........ G01D 11/28; G01D 13/22; G01D 13/26; G01D 13/265; B60K 35/00; B60K 2370/698; B60K 2370/331
(Continued)

(56) References Cited

U.S. PATENT DOCUMENTS 4,625,262 A 11/1986 Sakakibara et al.
5,603,283 A * 2/1997 Owen .................... G01D 11/28
116/284
(Continued)

FOREIGN PATENT DOCUMENTS

EP 0295165 A1 12/1988
EP 0984249 A1 3/2000
(Continued)

OTHER PUBLICATIONS

Search Report and Written Opinion issued by the Italian Patent Office for Italian Patent Application No. IT UB20159450 dated Sep. 8, 2016.

Primary Examiner — Nimeshkumar D Patel
Assistant Examiner — Tania Courson
(74) Attorney, Agent, or Firm — Howard & Howard Attorneys PLLC

(57) ABSTRACT

A pointer device has a light-guiding body, including a shaft, a hub coaxial with the shaft and having a rear surface covered by a shield, and a pointer, which projects radially from the hub. A cap is defined by at least one piece separate from the light-guiding body and is mounted on the hub in a fixed position. The hub has an emitting surface, a first reflecting surface configured to reflect and direct a first light flow from the shaft to the pointer, and at least a second reflecting surface, which is configured to reflect and direct a second light flow from the shaft to the emitting surface and is, at least in part, set apart from the first reflecting surface. The cap has at least one light-permeable area, aligned with the emitting surface, and a barrier arranged radially between the emitting surface and the first reflecting surface.

12 Claims, 4 Drawing Sheets

(51) Int. Cl.
*G01D 13/26* (2006.01)
*B60K 35/00* (2006.01)

(52) U.S. Cl.
CPC .. *B60K 2370/331* (2019.05); *B60K 2370/698* (2019.05)

(58) Field of Classification Search
USPC ........ 116/288, DIG. 6, DIG. 36, 48, DIG. 5; 362/23.01, 23.07, 23.09, 23.12, 23.13, 362/23.19, 23.2, 23.21; 340/815.78
See application file for complete search history.

(56) References Cited

U.S. PATENT DOCUMENTS

| | | | | |
|---|---|---|---|---|
| 6,955,438 | B2 * | 10/2005 | Ishii ....................... | G01D 11/28 116/288 |
| 9,404,772 | B2 * | 8/2016 | Sherman et al. ...... | G01D 11/28 |
| 9,638,551 | B2 * | 5/2017 | Ookura .................. | G01D 11/28 |
| 2007/0035960 | A1 * | 2/2007 | Birman et al. ......... | G01D 11/28 362/489 |
| 2008/0264328 | A1 * | 10/2008 | Birman .................. | G01D 11/28 116/288 |
| 2017/0176224 | A1 * | 6/2017 | Birman ................ | G01D 13/265 |
| 2018/0364078 | A1 * | 12/2018 | Ollila .................... | G01D 13/265 |

FOREIGN PATENT DOCUMENTS

| | | | | |
|---|---|---|---|---|
| JP | 2002257604 | A | 9/2002 | |
| JP | 2005257293 | A | 9/2005 | |
| JP | 5533746 | B2 * | 6/2014 | ............. G01D 13/22 |
| JP | 2014153277 | A * | 8/2014 | ............. G01D 13/22 |

* cited by examiner

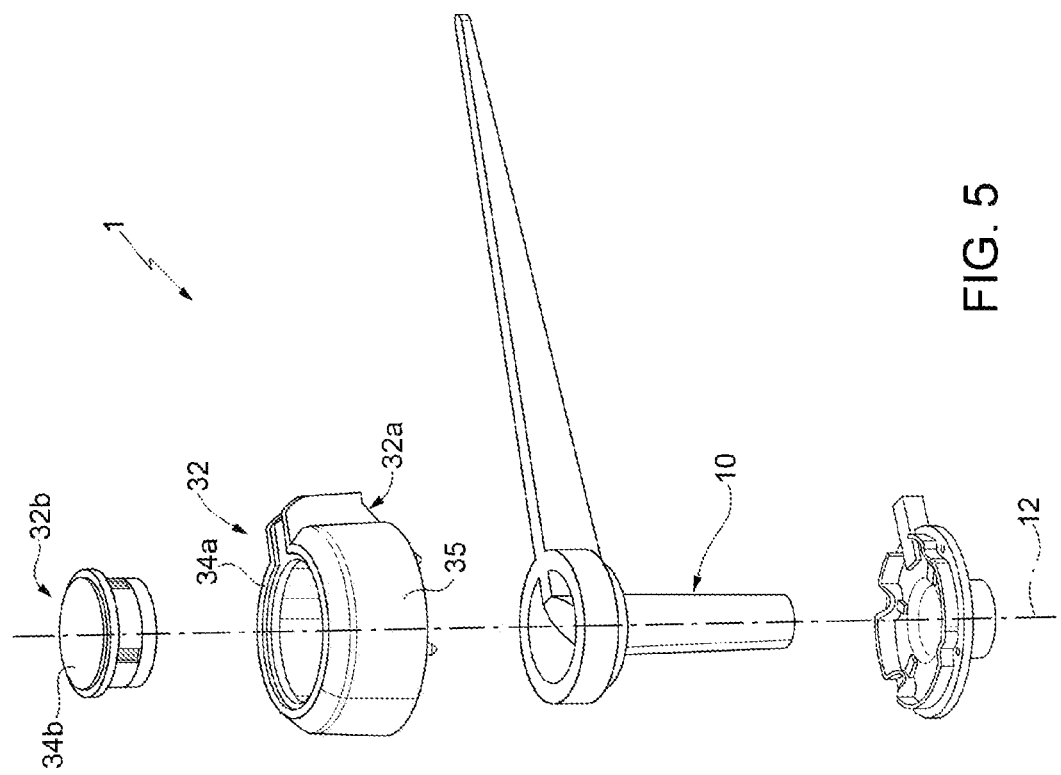
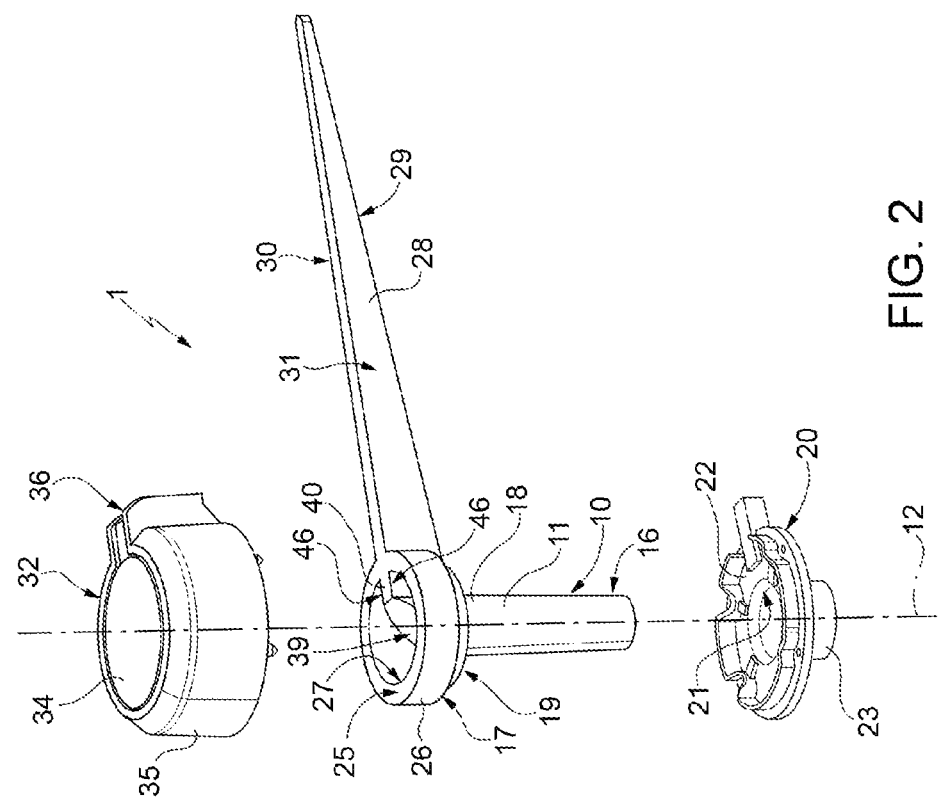

US 10,584,985 B2

POINTER DEVICE FOR AN INDICATOR INSTRUMENT, IN PARTICULAR FOR A VEHICLE

The present invention relates to a pointer device for an indicator instrument, in particular for a vehicle.

BACKGROUND OF THE INVENTION

As is known, instrument panels for vehicles are provided with indicator instruments to provide numerical information to the driver, for example information on the speed of the vehicle and the rotation speed of the combustion engine. In general, these instruments are provided with a dial having a series of markings and/or numbers, and a pointer device having a rotating body that is made of a light-guiding material. This rotating body comprises a hub, hinged about an axis to turn under the action of a motor, and a pointer that projects radially from the hub to indicate the marking or number corresponding to the information to provide to the driver. The front face of the pointer is illuminated, at least in night-driving operating conditions, through one or more light sources arranged close to the hub and beneath the dial.

Within the ambit of these solutions, patent EP0967465, which corresponds to the preamble of claim 1, teaches the provision of a cap mounted on the hub and a shield that covers the bottom of the hub to prevent glowing halos on the dial. In patent EP0984249, the cap is co-moulded or over-moulded on the hub so as to form a single piece with the latter and has an appendage that engages a recess made in the light-guiding material of the hub.

A need is felt to improve known solutions of the type just described, in order to make other areas other than the pointer luminous, but with a brightness that, as far as possible, is uniform and disturbance-free, and with the possibility, in the design stage, of setting the amount of light transmitted by the light-guiding material to the various areas to be made luminous.

SUMMARY OF THE INVENTION

The object of the present invention is to provide a pointer device for an indicator instrument, in particular for a vehicle, which enables fulfilling the requirement set forth above in a simple and economic manner.

According to the present invention, a pointer device is provided for an indicator instrument, in particular for a vehicle, as defined in claim 1.

BRIEF DESCRIPTION OF THE DRAWINGS

The invention shall now be described with reference to the accompanying drawings, which illustrate a non-limitative embodiment, in which:

FIG. 2 is an exploded view of the pointer device in FIG. 1;

FIG. 5 is similar to FIG. 2 and shows a variant of the pointer device of the present invention.

DETAILED DESCRIPTION OF THE INVENTION

Figure 1:
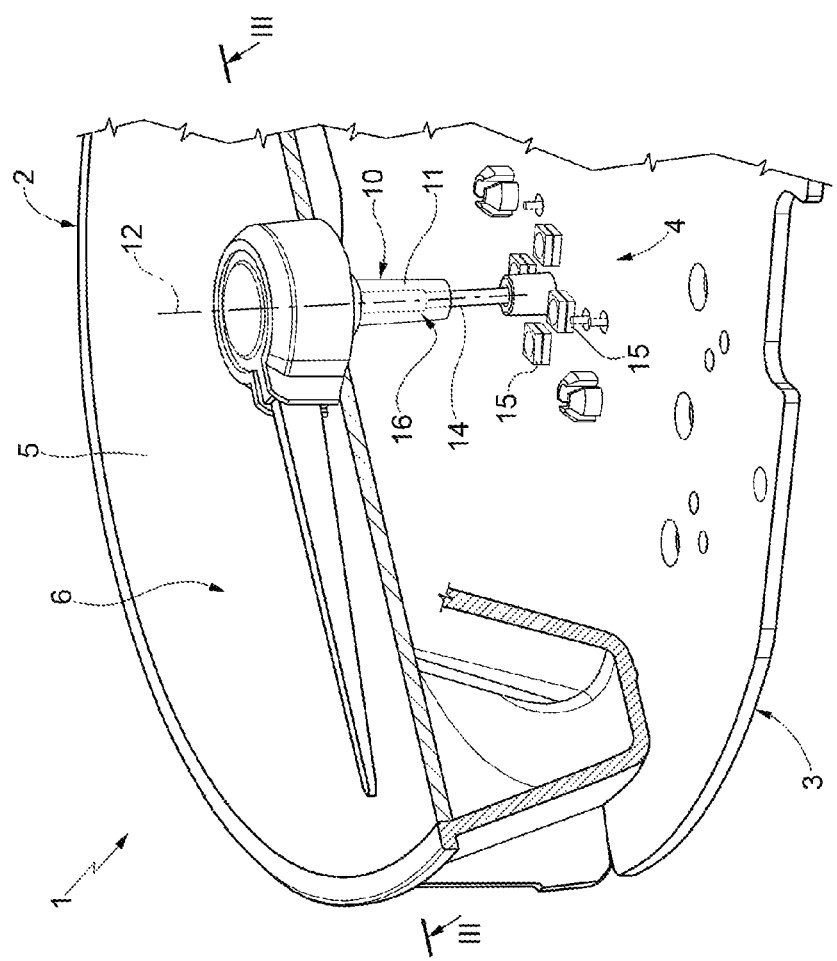
FIG. 1 is a perspective view, with parts removed for clarity, of an indicator instrument, in particular for a vehicle, equipped with a preferred embodiment of the pointer device according to the present invention.

In FIG. 1, reference numeral 1 indicates a pointer device forming part of an indicator instrument 2 (partially shown), in particular for a vehicle (not shown).

The indicator instrument 2 comprises a fixed structure 3, which constitutes part of an instrument panel of the vehicle, has an internal cavity 4 and comprises a dial 5 having a front face 6 facing out from the opposite side with respect to the cavity 4, namely towards the outside of the instrument 2 and, consequently, towards a driver of the vehicle. The face 6 has a plurality of markings and/or numbers (not shown) to allow the pointer device 1 to provide numerical information on the functioning of the vehicle.

The pointer device 1 comprises a body 10, which is defined by a single piece, constituted by a light-guiding material of known type. The body 10 comprises a shaft 11, which has an axis 12, extends into the cavity 4 and axially passes through the dial 5, and is rotatable about axis 12 under the operation of an actuator (not shown). In particular, this actuator is defined by an electric motor placed behind the structure 3 and drives a rotating shaft 14 that extends into the cavity 4 and is coaxial and fixed with respect to the shaft 11.

The cavity 4 houses at least one light source 15, for example a LED, which directly faces a free external surface 16 of the shaft 11, and so the light emitted by the light source 15 enters, through surface 16, into the light-guiding material, which then transmits it throughout the body 10.

Referring to FIG. 2, the body 10 further comprises a hub 17, which is coaxial with the shaft 11 and is placed on an axial end 18 of the shaft 11 and outside of the cavity 4. The hub 17 has a rear surface 19, which faces the face 6 and is covered by a shield 20, which is coaxial with the hub 17, has a through hole 21 engaged by end 18 and is opaque. Here and in the following, it is understood that the term "opaque" means an element having properties such as to block the passage of light. In this case, the shield 20 prevents light emitted from surface 19 from reaching the face 6 and consequently forming glowing halos on the face 6. Preferably, the shield 20 is defined by a piece separate from the body 10 and is directly or indirectly fastened to the hub 17. In particular, the shield 20 comprises a ring-shaped plate 22 placed on top of surface 19 and a collar 23, which protrudes from an inner annular edge of the plate 22 and is fitted around end 18 to prevent light emitted from end 18 from reaching the face 6 and consequently forming glowing halos.

On the axially opposite side with respect to surface 19, the hub 17 has a front surface 25 that extends transversely to axis 12 (in the particular case shown, it is defined by an annulus coaxial with shaft 11) and, in use, emits light that is visible outside the pointer device 1.

The body 10 further comprises a pointer 28, which projects radially outwards from the hub 17 and is defined by a rear face 29 facing the face 6, by a front face 30 opposite to face 29, and by two mutually opposite side faces 31.

Figure 3:
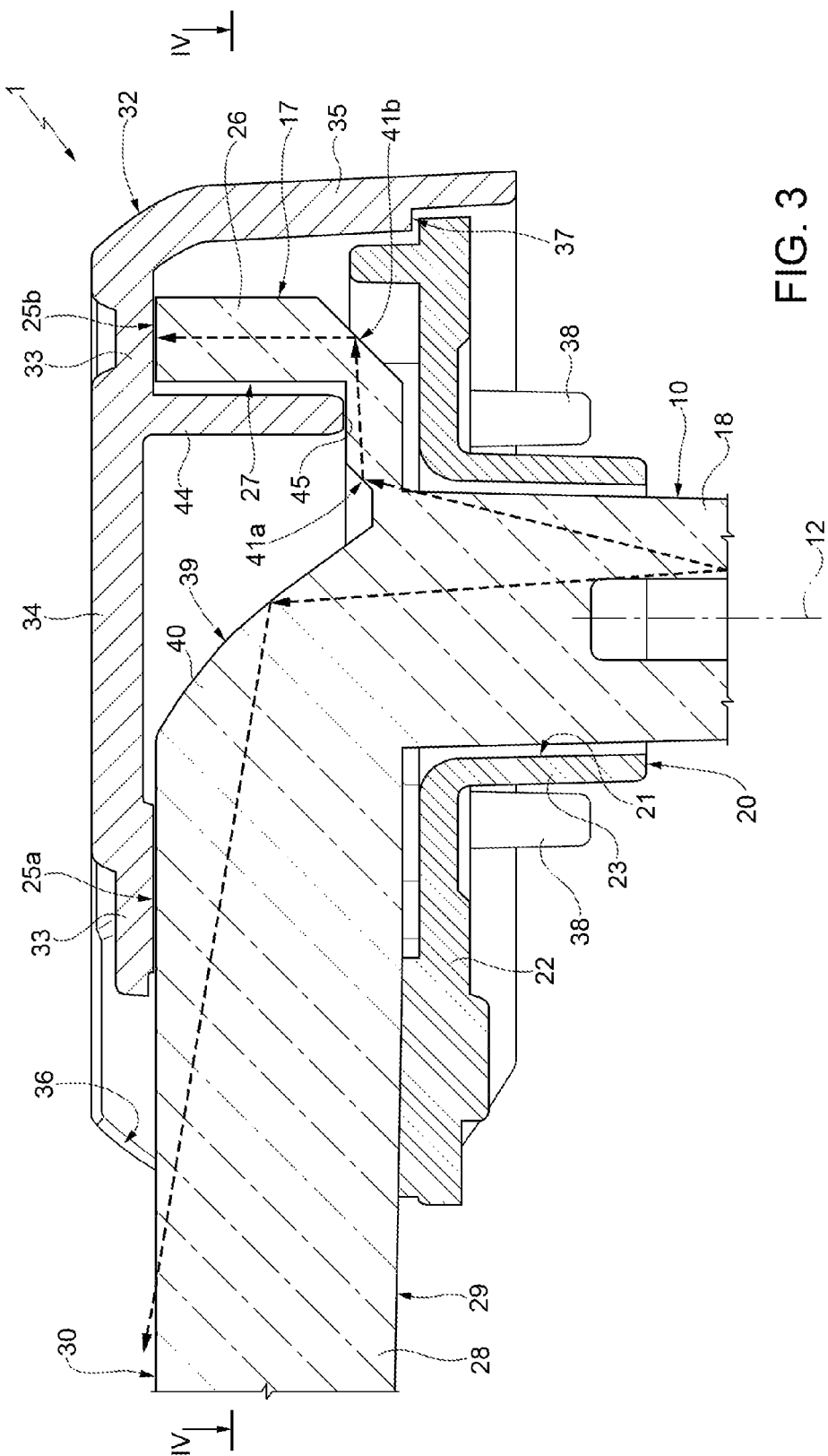
FIG. 3 is a cross-section along section line of FIG. 1 and shows, on an enlarged scale, a detail of the pointer device of the present invention.

Referring to FIG. 3, surface 25 is constituted by two areas 25a and 25b, of which area 25a is defined by the intersection of surface 25 with face 30, while area 25b regards the remaining arc of the annulus. The hub 17 comprises a portion 26 that is configured to guide the light towards surface 25 and radially delimits a recess 27 that is open to the axial end of the hub 17. In particular, portion 26 axially terminates on area 25b and so guides the light directly to area 25b.

The pointer device 1 further comprises a cap or button 32, which is defined by at least one piece, is separate from the body 10, is mounted on the hub 17 and is fixed with respect to the latter. In the example in FIG. 2, the cap 32 is defined by a single piece of transparent material with an opaque coating (not shown) that covers most of the outer surface of the transparent material so as to leave at least one portion uncovered, which therefore remains transparent. Referring to FIG. 3, this transparent portion corresponds to a light-permeable passageway 33, which allows a light flow to leave through the cap 32. The passageway 33 has substantially the same shape and size as surface 25 and is aligned with the latter so as to let the light flow emitted from surface 25 be seen from the outside, in addition to the light flow that is emitted from the pointer 28. In the remaining portions of the cap 32, the coating blocks the transmission of light from the hub 17 to the outside. In particular, the light flow that is emitted from area 25b and through the passageway 33 performs an aesthetic function.

The cap 32 has a substantially cup-like external shape. In fact, the cap 32 comprises a front wall 34, which is transversal to axis 12, closes the recess 27 and faces surface 25, and a side wall 35, which projects from the outer perimeter edge of wall 34 so as to surround the hub 17 and has an opening 36 through which the pointer 28 passes. The perimeter of the opening 36 can be defined entirely by the cap 32, or by the cap 32 and shield 20 combined, as in the case shown.

In the example shown, surface 25 and the corresponding passageway 33 are designed to align with wall 34. However, other positions and/or other shapes could be provided for surface 25 and the passageway 33.

Advantageously, the cap 32 is not directly fastened to the hub 17, but it is fastened to the shield 20 so as to axially force the hub 17 between plate 22 and wall 34: in particular, plate 22 engages an end seat 37 defined by wall 35 and is coupled by teeth 38 that protrude from the wall 35. However, other fastening systems could be provided for the cap 32, with the exception of co-moulding and over-moulding techniques, which must be excluded to prevent the opaque material of the cap 32 becoming integral with the light-guiding material of the body 10 and consequently causing absorption and/or disturbance in the transmission and reflection of light in the body 10.

In the variant in FIG. 5, the cap 32 is defined by two separate pieces 32a and 32b, which are made of an opaque material and so do not need any coating or painting operation, as is instead needed for the embodiment in FIG. 2. The pieces 32a and 32b are placed in positions such as to delimit at least one empty space or opening, which corresponds to the passageway 33 for light emitted from the hub 17. In particular, piece 32a comprises wall 35 and an annular peripheral portion 34a of wall 34. Whereas piece 32b comprises a central portion 34b of wall 34 and is coaxial with piece 32a along axis 12. Piece 32b is radially spaced apart from piece 32a and is preferably fastened directly to the hub 17, in a manner not shown in detail, by a snap connection or by an interference fit in the recess 27, so as to be mounted on the hub 17 by simply press fitting.

According to a variant that is not shown, the cap 32 is defined by a single piece made of an opaque material and comprising two portions that are joined together only in a limited area, so as to delimit between them at least one empty space or opening that corresponds to a passageway 33.

Again with reference to FIG. 3, the hub 17 has a reflecting surface 39, generally referred to as a "prism", which is arranged in the recess 27 and delimits a shaped portion 40. Portion 40 protrudes radially from portion 26 towards the inside of the recess 27 and is radially aligned with the pointer 28. The reflecting surface 39 is positioned and shaped to reflect light coming from the shaft 11 towards face 30, which therefore becomes luminous. This illumination has the technical function of making the pointer 28 visible to the driver, especially in night-driving conditions.

Optionally, face 30 and/or surface 25 could be treated, processed and/or covered in a coating so as to generate special optical effects, for example to generate a particular colouring. Similarly, face 29 and/or faces 31 could be treated, processed or covered in a coating to filter or block the transmission of light towards the outside and/or to increase the reflection of light towards face 30.

According to one aspect of the present invention, the light arrives from the shaft 11 to portion 26 indirectly, i.e. via a least one reflection. To this end, the hub 17 has at least one reflecting surface or "prism" 41a having at least one area that is distinct and set apart from reflecting surface 39. In this way, it is possible to better define the positions, widths and shapes of the reflecting surfaces 39 and 41a in the design stage, in a mutually independent manner. In particular, reflecting surface 41a is also at the bottom of the recess 27 and has at least one area radially set apart from reflecting surface 39 (in particular, along the radial axis of the pointer 28).

In particular, to transmit light from the shaft 11 to area 25b, as well as to reflecting surface 41a, the external surface of the hub 17 comprises a reflecting surface 41b, which faces towards wall 35 and/or towards the shield 20. In the particular configuration shown, portion 26 starts at reflecting surface 41b and ends on area 25b.

According to one aspect of the present invention, the cap 32 comprises an appendage 44, which is opaque, projects from an intermediate portion of the wall 34 into the recess 27 and defines a barrier arranged radially between reflecting surface and area 25b. In this way, the part of the light that leaves via reflecting surface 39 in the recess 27 does not reach area 25b, and so disturbances and/or changes in luminosity of surface 25 are limited. In other words, the amount of light that arrives to area 25b is basically determined by the position, width and shape of the reflecting surfaces 41a and 41b, which are set in the design stage independently of the reflecting surface 39.

Preferably, the appendage 44 has an axial length such as to completely engage the recess 27, and so terminate axially with an edge 45 as close as possible to the bottom of the recess 27 in the hub 17. In other words, the axial length of the appendage 44 is substantially equal to that of portion 26 to limit, as far as possible, interference on the light guided by portion 26.

Figure 4:
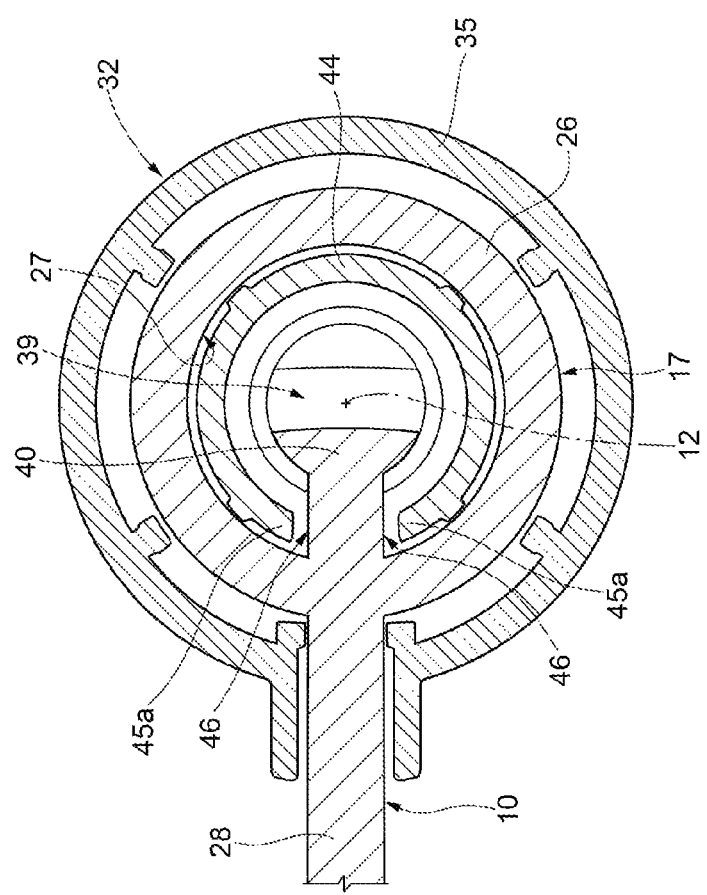
FIG. 4 is a cross-section along section line IV-IV of FIG. 3.

As visible in FIG. 4, the appendage 44 has an extension, also about axis 12, such as to completely engage the recess 27. In fact, the appendage 44 terminates in the circumferential direction with two edges 45a that come as close as possible to the opposite side faces 46 of portion 40. Thus, the appendage 44 is interposed as far as possible between portions 40 and 26 of the hub 17 to limit disturbance or interference between the light destined for area 25b and the light destined for reflecting surface 39 and, consequently, for face 30.

From that set forth above, it is evident that the configuration of the hub 17 and that of the cap 32 enable separating the light coming from the shaft 11 inside the body 10 into two independent flows. In fact, as explained above, on one hand it is possible to design reflecting surface 39 separately from reflecting surfaces 41a and 41b so as to calibrate the amount of light reflected for each of the two light flows, in a manner substantially independent of the calibration of the other flow. On the other hand, the flow that enters the main portion 40 and encounters the reflecting surface 39 does not interfere with the flow that enters portion 26 and vice versa.

Furthermore, it is evident that the proposed solution is advantageous both from the viewpoint of the small number of components and from the viewpoint of ease of assembly.

Finally, it clear that modifications and variants can be made regarding the pointer device 1 described with reference to the accompanying drawings without departing from the scope of the present invention, as defined in the appended claims.

In particular, the shape and size of the various pieces can be different from those shown; furthermore, as mentioned above, the position, width and shape of the passageway 33 and surface could also be different from that indicated by way of example.

Furthermore, the pointer device 1 could be used in applications other than the automotive one.

The invention claimed is:

1. A pointer device for an indicator instrument for a vehicle, the device comprising:
    a body, which is defined by a single piece, is made of a light-guiding material and comprises:
    a) a shaft having an axis and comprising a free surface for receiving light from a light source;
    b) a hub, which is coaxial with said shaft and has an external surface comprising a rear surface facing said shaft;
    c) a pointer, which projects radially outwards from said hub;
    a shield, which covers said rear surface so as to block the light emitted, in use, by said rear surface; and
    a cap, which is defined by at least one piece separate from said body and is mounted on said hub in a fixed position;
    wherein the external surface of said hub further comprises:
    an emitting surface;
    a first reflecting surface configured to reflect and direct a first light flow from said shaft to said pointer; and
    at least a second reflecting surface, which is configured to reflect and direct a second light flow from said shaft to said emitting surface and comprises at least one area set apart from said first reflecting surface;
    and wherein said cap defines at least one light-permeable passageway aligned with said emitting surface, to let the second light flow pass to the outside;
    said hub comprising a portion, which radially delimits a recess, open at an axial end of the hub;
    said portion axially ending at said emitting surface so as to guide said second light flow to said emitting surface;
    said cap comprising an arcuate appendage disposed about said axis of said shaft, said appendage arranged in said recess between said emitting surface and said first reflecting surface in such a manner to define a barrier suitable to block the part of the light that, in use, leaves the hub via said first reflecting surface into said recess in order not to reach said emitting surface.

2. The device according to claim 1, wherein said appendage projects axially and is arranged radially between said emitting surface and said first reflecting surface.

3. The device according to claim 2, wherein:
    said cap comprises a front wall that axially closes said recess; and
    said appendage protrudes into said recess from said front wall.

4. The device according to claim 3, wherein said appendage has an axial size such that it completely engages said recess.

5. The device according to claim 3, wherein said appendage has an angular size about said axis so as to completely engage said recess.

6. The device according to claim 3, wherein said first and second reflecting surfaces are arranged in said recess.

7. The device according to claim 6, wherein the external surface of said hub further comprises a third reflecting surface configured to reflect and direct said second light flow from said second reflecting surface to said emitting surface.

8. The device according to claim 7, wherein said portion starts at said third reflecting surface and ends at said emitting surface so as to guide said second light flow without further reflections.

9. The device according to claim 1, wherein said cap comprises a single piece made of a transparent material and an opaque coating placed on said transparent material so as to leave at least one uncovered transparent portion defining said passageway.

10. The device according to claim 1, wherein said cap is made of an opaque material and comprises a first and a second portion arranged in positions so as to delimit between them at least one gap defining said passageway.

11. The device according to claim 10, wherein said first and second portions are respectively defined by a first and a second part, separated from each other and mutually coaxial.

12. The device according to claim 11, wherein said first part is fastened directly to said hub by a snap connection or by an interference fit.

* * * * *